United States Patent Office 2,782,020
Patented Feb. 19, 1957

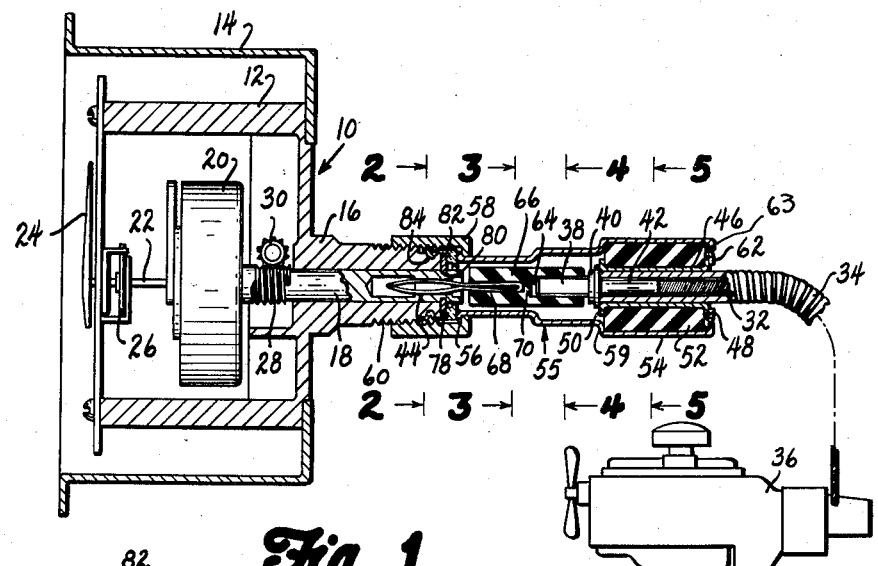

2,782,020

SPEEDOMETER DRIVING MEANS

William McCandless, Toledo, Ohio

Application November 5, 1954, Serial No. 467,169

12 Claims. (Cl. 264—2)

This invention relates to speedometers, more particularly to speedometer driving means.

For many years speedometers, mounted on the dashboards of the automotive vehicles, have been operated by magnetic eddy current devices including a speed cup, preferably of aluminum, which is subjected to a rotating magnetic field. Various constructions utilizing this principle have been used in the past and, generally speaking, either the permanent magnet which creates the magnetic field is rotated, or the permanent magnet in combination with a magnetic field member are rotated together by means of a flexible cable, which is connected at the distal end to the driving gear of the automotive vehicle. The flexible cable is generally made of metallic wires which are coiled in opposite directions and rotatably mounted in the interior of a flexible tube usually consisting of a formed strip of metal wound in locking relation in spiral fashion to form a housing to protect the fragile core from weather conditions.

Although this general construction has provided a very reliable means for driving the speedometer pointer in the instrument on the dashboard, and also to drive the odometer means in the same casing, several disadvantages have been attendant with the use of this construction, in that noises, arising either from the rotating parts of the driving gear or from vibrations arising from friction between the rotating flexible core and its surrounding housing, have been transmitted to the interior of the automotive vehicle so as to give rise to an objectionable noise level very noticeable to the occupants of the vehicle. Many solutions have been offered for the diminution or elimination of this noise, including oversized cables and housings, also insulating exterior wrappings on the cable housing, also various mounting means to control the location of the flexible cable in order to prevent kinking, and in many others. None of these solutions has been satisfactory in solving the noise problem and many of them have been objectionable due to their excessive cost.

Another problem attendant with the use of speedometers of this type arises from the jumpy or unsteady motion of the speedometer pointer over the indicated range of speed which generally derived from the vibration characteristics of the various parts, so that when a certain fundamental frequency was reached, the parts would tend to oscillate together which would be reflected in the unsteady motion of the indicating pointer of the speedometer. Although this point of unsteady motion was generally found in the neighborhood of thirty miles per hour, as indicated by the speedometer pointer, this point could vary widely over the scale depending upon the characteristics of the particular instrument. Many solutions have also been offered for this problem in conjunction with the noise problem pointed out above. None, however, has been entirely satisfactory and in many cases the solutions offered were too costly to be economically feasible.

The present invention contemplates the provision of a cheap, simple construction for dampening the noise attendant with the operation of a speedometer arising from the various vibratory sources, either in the driving gear of the automotive vehicle, or from within the flexible cable itself which is connected immediately behind the speedometer casing so as to prevent transmission of noises to the instrument mounted on the dashboard, thereby obviating the undesirable noise level annoying to occupants of the vehicle.

The invention further contemplates the provision of a means whereby the vibration oscillations of the pointer of a speedometer are substantially obviated by providing a damping means for the rotating core of the flexible cable of the speedometer, which is positioned between the rotating core of the cable and the rotating magnet construction which actuates the speed cup connected to the speedometer pointer. The mechanism contemplated also provides a resilient driving connection for the parts of the device which compensates for tolerances during manufacture whereby chocking is prevented which, in the past, has tended to accentuate the unsteady oscillations of the speedometer pointer at critical speeds.

It is, therefore, a principal object of this invention to provide a damping means positioned between the flexible cable of a speedometer and the rotating magnet thereof which prevents transmission of extraneous noises from the flexible cable to the speedometer mounted on the dash of an automotive vehicle.

It is a further object of this invention to provide a damping means for the rotating parts of a speedometer of the eddy current type positioned in series relation with the rotating parts driven by the running gear of an automotive vehicle which provides a resilient connection between the parts to compensate for tolerances arising during manufacturing procedures to prevent noise transmission and also to lessen the vibrations of the speedometer pointer arising from chocking.

It is a further object of this invention to provide a damping means for the housing of a flexible cable of a speedometer driving means to prevent transmission of noises to the indicating head of the speedometer.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a sectional elevation of a speedometer driving means incorporating the invention;

Fig. 2 is a sectional elevation taken along the line 2—2 of Fig. 1;

Fig. 3 is a sectional elevation taken along the line 3—3 of Fig. 1;

Fig. 4 is a sectional elevation taken along the line 4—4 of Fig. 1;

Fig. 5 is a sectional elevation taken along the line 5—5 of Fig. 1;

Fig. 6 is an isometric view of a part of the driving means;

Fig. 7 is a plan view of a modification of the device shown in Fig. 6;

Fig. 8 is a perspective view of another modification;

Fig. 9 is a sectional elevation similar to Fig. 2 showing the element in Fig. 8 in operative position;

Fig. 10 is a sectional elevation of a modification of the driving means; and

Fig. 11 is a sectional elevation taken along the line 11—11 of Fig. 10.

Referring now to the drawings, particularly to Fig. 1, the speedometer assembly 10 is provided which may be positioned on the dash-board of an automotive vehicle so as to be visible to the driver and occupants of the vehicle. The speedometer assembly comprises generally of a frame-work 12 enclosed in a housing 14, which is usually provided with a bezel and an enclosing glass front plate which are not shown. The frame member 12 is provided with a rearwardly-projecting integral boss 16, in which is journaled a rotating shaft 18 on the left end of which is positioned the rotating magnet and field assembly 20 actuating a speed cup by eddy currents, to which a pointer shaft 22 is attached to move a pointer 24 against the bias of a hair spring 26. The shaft 18 is also provided with a worm 28 which cooperates with a worm gear 30 to actuate an odometer mechanism which is not shown. The details of construction of the speedometer assembly may vary widely and have features of construction which are well known in the art. The rotating shaft 18 of the speedometer is driven by a flexible rotating core 32 of a flexible cable 34 including a housing, the core being connected to and adapted to be driven by a rotating part of an automotive engine 36, as is well known in the art.

The locus of the present invention is the connection between the rotating core 32 to the shaft 18 of the speedometer and also the connection between the flexible housing 32 to the frame-work 12 of the speedometer assembly. In the past, the non-circular or squared end 38 of the rotating core 32, which preferably is a separate sleeve provided with a collar 40 and a rearwardly-extending tube 42 which may be soldered to the end of the rotating core 34, was directly connected into a non-circular or squared well 44 in the rear end of the shaft 18. This provided a direct mechanical connection between the parts, so that any vibrational noises which arose by reason of the moving parts of the engine 36, or by the rotation of the core 32 in the flexible tube 34 were transmitted directly to the frame 12 of the speedometer assembly. This transmission of vibration, with attendant noise, created an undesirable condition in the body of the automotive vehicle inasmuch as the noise level in aggravated cases became so high that it became an annoyance to the occupants of the vehicle. As has been pointed out hereinbefore, this invention is intended to provide a dampening means suitable to be positioned between the end of the flexible cable and core 32 and the housing 34, whereby transmission of these undesirable noises is prevented and a much quieter operation of the speedometer is, therefore, had. Furthermore, the dampening means have the further advantage that the movement of the indicating pointer 24 over the face of the speedometer dial is much smoother without excessive oscillation which was often found in speedometers as used in automotive vehicles, due to the fact that when fundamental frequencies of vibration were reached, the oscillation of the needle became prohibitive, and essentially destroyed the fundamental value of the speedometer.

The flexible tube or housing 34 is provided with a closely embracing sleeve 46 affixed thereto, which is provided with outwardly-extending flanges at its ends, the rearward flange 48 being approximately the same size as the forward flange 50 which is positioned adjacent the terminating end of the tube 34. Between the flanges 48 and 50, an annular damping member 52 is positioned resiliently encircling the hub of the sleeve 46, and is preferably made of a relatively hard rubbery material, such as Buna N rubber or neoprene, it being necessary that the rubbery body be resistant to the action of oil and grease in view of the fact that the core 32 rotating within the housing 34, is provided with lubrication.

The exterior of the annular damping member 52 is seated in an enlarged portion 54 of a thimble or housing 55 which is thereafter reduced in diameter, preferably in steps until it terminates in a flange 56 adapted to abut against the terminating portions of the boss 16, against which the flange 56 is urged by a threaded sleeve 58 engaging threaded portion 60 on the exterior of the boss 16. The annular member 52 is compressed between the enlarged portion 54 of the outer housing or thimble, and the hub 46 of the sleeve member, already described, and excessive end movement of the annular member 52 is prevented by the flange 50 and the first step 57 in the thimble portion as is clearly indicated. At the opposite end of the annular member 52, it is seated against the flange 48 and is engaged by inwardly-turned nibs 62 on the enlarged portion 54 of the thimble 55. A washer 63 is provided underneath the nibs 62 to distribute uniformly the pressure between the nibs and the rubbery member 52. Neither the nibs nor the washer touches flange 48, so that the annular member is completely insulated from the housing by the rubbery member. In this manner, the member 52 and the housing 34 for the core 32 are resiliently held in alignment with the axis of the shaft 18 which the core 32 is adapted to drive by means to be described hereinafter. At the same time, the annular member 52 provides a damping means which prevents the transmission of noise telegraphed along the housing 34 from being transmitted to the enlarged portion 54 of the thimble.

In a similar manner, the non-circular or rectangular portion of the member 38, which is preferably soldered to the terminating end of the rotating core 34, is seated in a rectangular slot or well 64 longitudinally positioned in the end of a second resilient body 66 which also is preferably made of relatively hard rubbery material such as Buna N rubber or neoprene. The slot 64 is made slightly smaller than the outer dimension of the non-circular portion of the driving member 38, so that it must be slightly stretched to allow fitting of the non-circular portion therein which tightly grips the non-circular portion to provide a good driving connection therebetween. The tube-like member 66 of the rubbery material extends a substantial distance beyond the end of the non-circular portion 38 of the core 34 to allow the positioning of the second rectangular slot or well 68 in the forward end of the tube substantially as shown in Fig. 3. It will be noted that the larger transverse dimension of the slot is positioned in this modification substantially ninety degrees from the larger dimension of the slot 64 as shown in Fig. 4. This construction allows a small wall portion 70 to be positioned between the slots 68 and 64 to prevent direct metal-to-metal contact between parts which are inserted in the respective slots. This is further assisted by the fact that the slots are twisted ninety degrees from each other.

Positioned in the forward slot 68 adjacent the boss 16 of the speedometer frame is spring terminal member 72 which is shown in perspective in Fig. 6, consisting of an integral piece of metallic spring material bent in substantial U-form with the terminating ends 74 thereof displaced in slightly arcuate form facing each other and extending forwardly substantially as shown in the figure. The main body of the spring 72 is bent into two parallel portions dimensioned to a size slightly larger than the dimension of the slot 68 in the rubbery body 66, so that this portion of the spring member will be tightly gripped when it is inserted in the slot. The bowed portions 74 of the spring member are transversely resilient and are dimensioned so that when in normal position, their juxtaposed relation is such that they will be compressed into the noncircular well 44 in the end of the shaft 18 as is shown in Fig. 2.

The resilient spring member 72 may have its forwardly-extending arcuate portions 74 displaced laterally, as shown in a modification in Fig. 7, substantially in the plane of their flat parallel portions adjacent the hinge 76. This has the advantage that when the arcuate portions 74 are inserted into the well 44 in the shaft 18, the arcuate members are both transversely compressed, while, at the same time, they are deformed to place them in substantially the same plane by pressure from lateral directions. This compensates for tolerances in the width of the arcuate members 74 with reference to the non-circular portion or squared portion of the well 44 as seen in Fig. 2, and provides a tight connection between these parts and prevents any movement between them during the rotation. It thereby prevents chocking and contributes substantially to the quiet operation of the assembly.

The torque provided by the rotating engine part is transmitted to the core 32 of the flexible cable, thence by its non-circular portion 38 to the rubbery resilient member 66, which transmits the torque to the spring member 72 which, in turn, drives the shaft 18 of the speedometer assembly by its relation with the non-circular well 44 positioned in the end thereof. The torque applied to the springy flexible cable 32 by the rotating engine part, at responding frequencies, often causes a torsional vibration when driving the pendulous-acting speedometer assembly 20, which is damped by the rubbery member 66 to result in a smoother movement of the pointer 24, as well as reducing the noise transmission as already pointed out.

As is well understood, the shaft 18 is prevented from moving in the direction of its longitudinal axis by a washer 78 fitted into an annular depression 80 in the shaft 18. The washer 78 is held between the base and the side portions of a cup-like member 62, which has its lip crimped into an annular slot 84 on the outer surface of the boss 16, and the end face of the boss to prevent end motion.

In Figs. 8 and 9, a modification of the terminal spring member 72 is shown. In this construction, the folded portion 76a is again provided, having, however, a bifurcated, forwardly-extending terminal portion 74a, positioned on one arm of the folded portion 76a. The dimension of the terminal portion 74a is such that it will snugly fit into a diagonal position in the squared well 44 of the shaft 18, as shown in Fig. 9, the bifurcations being slightly sprung to give a resilient connection between the cooperating parts.

Figs. 10 and 11 disclose another modification of the device wherein the spring member 72 is dispensed with, the rubber body 86 performing the same function as the rubber-like body 66, already described, being provided with a continuous central aperture 88 having a rectilinear conformation as is shown in Fig. 11, into which are inserted the non-circular portions 38 of the sleeve member 42 similar to that already described, and in the other end a non-circular portion 90 provided on the end of the shaft 18 in place of the non-circular well 44, already described in the earlier modification. The remaining construction is very similar in this modification to that already described, and no further description thereof will be given.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a device of the class described, a rotating flexible core-like driving means, a flexible housing enclosing said driving means cooperating with a fixed portion of an engine having a rotating part rotating the flexible core-like driving means, a non-circular end portion on the rotating driving means distal from the engine, a body of rubbery dampening material adapted to resiliently engage the non-circular end portion of the driving means and extending beyond the portion, a conventional speedometer including a driven shaft, non-circular means located on the driven shaft of the speedometer adapted to cooperate with the dampening body to drive the shaft by means of the rotating core-like driving means, and means cooperating with the speedometer and adapted to cooperate with the flexible housing of the driving means to hold the parts in assembled relation.

2. In a device of the class described, a rotating flexible driving means, a flexible housing enclosing said driving means cooperating with a fixed portion of an engine having a rotating part adapted to rotate the flexible driving means, a dampening member of rubbery material adapted to engage the end of the driving means distal from the driven end, said dampening member being adapted by engaging elements to drive the driven shaft of a conventional speedometer assembly by means of the torque transmitted by the rotating driving means, and means cooperating with the speedometer indicating assembly and adapted to cooperate with the flexible housing for the driving means to hold the parts in assembled relation.

3. In a device of the class described, a rotating flexible driving means, a flexible housing enclosing said driving means cooperating with a fixed portion of an engine having a driving part rotating the flexible driving means, a non-circular end portion on the rotating driving means distal from the engine, a tube-like body of rubbery dampening material adapted to resiliently engage the non-circular end portion of the driving means, a speedometer including a driven shaft, non-circular portion positioned on the end of the driven shaft of the speedometer adapted to engage with the tube of rubbery material to drive the shaft by means of the torque transmitted by the rotating driving means, and means cooperating with the speedometer adapted also to cooperate with the flexible housing of the driving means to hold the parts in assembled relation.

4. In a device of the class described, a rotating flexible driving means, a flexible housing enclosing said driving means cooperating with a fixed portion of an engine having a rotating part rotating the flexible driving means, a non-circular portion on the end of the rotating driving means distal from the engine, a tube-like body of rubbery dampening material adapted to resiliently engage the non-circular end portion of the driving means, non-circular means located on the driving shaft of a conventional speedometer assembly, a transversely resilient metal clip member adapted to cooperate with the non-circular means on the shaft and adapted to fit into the end of the tube to drive the shaft by means of the torque transmitted by the rotating driving means, and casing means cooperating with the speedometer assembly and adapted also to cooperate with the housing for the driving means to hold the parts in assembled relation.

5. In a device of the class described, an elongated metallic flexible core, a flexible housing enclosing said core cooperating with a fixed portion of an engine having a rotating part adapted to rotate the flexible core, a noise dampening member of rubbery material adapted to engage the end of the core distal from the driven end, said dampening member including an expansive metal clip adapted to drive the driven shaft of a conventional speedometer assembly by cooperating with a non-circular portion, and thimble means cooperating with the speedometer assembly and adapted to cooperate with the flexible housing for the core to hold the parts in assembled relation.

6. In a device of the class described, an elongated flexible metallic core, a flexible metallic housing enclosing said core attached to a fixed portion of an engine having a rotating part adapted to rotate the flexible core, a non-circular end portion on the core distal from the engine, a dampening member of rubbery material adapted to engage the non-circular end portion of the core, said dampening member being adapted to resiliently grip and drive the driven shaft of a conventional speedometer assembly by means of the torque transmitted by the rotating core, and means cooperating with the speedometer indicating assembly and the flexible housing for the core to hold the parts in assembled relation.

7. In a device of the class described, an elongated rotating flexible driving means, a flexible housing enclosing said driving means attached to a fixed portion of an engine having a rotating part adapted to rotate the flexible driving means, a non-circular end portion on the driving means distal from the engine, a speedometer including a driven shaft, a dampening member of rubbery material adapted to engage the non-circular portion of the driving means, said dampening member including a spring metal clip transversely resilient being adapted to drive the driven shaft of the speedometer by having the spring clip cooperate with a non-circular well therein, and thimble means including a threaded sleeve attached to the speedometer and adapted to cooperate with the flexible housing for the driving means to hold the parts in assembled relation.

8. In a device of the class described, a speedometer assembly of the eddy current type suitable to indicate speed when actuated by a rotating engine part, including a flexible rotating core driven by the engine and housed in a flexible tube, damping means positioned between the rotating core and the rotating part of the speedometer assembly comprising a rubbery body resiliently gripping non-circular portions on both parts, and a second damping means comprising a rubbery body positioned between the tube and a non-rotating portion of the speedometer assembly, whereby noise transmission is prevented to the speedometer.

9. In a device of the class described, a speedometer assembly of the eddy-current type suitable to indicate speed when actuated by a rotating engine part, including a flexible rotating core driven by the engine and housed in a flexible tube, damping means positioned between the rotating core and the rotating part of the speedometer assembly comprising a rubbery body including a clip of spring metal transversely flexible, resiliently gripping non-circular portions on both parts to form a driving connection, and a second damping means also comprising a rubbery body positioned between the tube and a non-rotating portion of the speedometer assembly, whereby noise transmission is prevented to the speedometer.

10. In a device of the class described, a speedometer assembly of the eddy-current type suitable to indicate speed when actuated by a rotating engine part, including a flexible rotating core driven by the engine and housed in a flexible tube for driving said speedometer, damping means positioned between the rotating core and the rotating part of the speedometer assembly comprising a rubbery body resiliently gripping non-circular portions on both parts, and a second damping means also comprising a rubbery body positioned between the tube and a protective housing removably attached to a non-rotating portion of the speedometer assembly, whereby noise transmission is prevented to the speedometer.

11. In a device of the class described, a speedometer assembly of the eddy-current type suitable to indicate speed when actuated by a rotating engine part, including a flexible rotating core driven by the engine and housed in a flexible tube, damping means positioned between the rotating core and the rotating part of the speedometer assembly comprising rubbery body including a spring clip of metal in folded juxtaposition with the fold positioned in the rubbery body, with the arms in oppositely bowed relation, being slightly displaced in a lateral direction so that when the arms of the spring clip are fitted into a noncircular well in the rotating part of the speedometer, the arms will be resiliently urged into alignment from the lateral direction while the bowed relation will simultaneously be depressed to give a resilient connection between the parts, and a second damping means also comprising a rubbery body positioned between the tube and a non-rotating portion of the speedometer assembly whereby noise transmission is prevented to the speedometer.

12. In a device of the class described, a speedometer assembly of the eddy-current type suitable to indicate speed when actuated by a rotating engine part, including a flexible rotating core driven by the engine and housed in a flexible tube, damping means positioned between the rotating core and the rotating part of the speedometer assembly comprising a rubbery body including a spring clip of metal having a portion in folded juxtaposition with the fold positioned in the rubbery body, the other portion extending from the folded portion being bifurcated to resiliently fit into the corners of a rectilinear well in the rotating part of the speedometer to give a resilient connection between the parts, and a second damping means also comprising a rubbery body positioned between the tube and a non-rotating portion of the speedometer assembly, whereby noise transmission is prevented to the speedometer.

References Cited in the file of this patent
UNITED STATES PATENTS

| | | |
|---|---|---|
| 1,897,964 | Zubaty | Feb. 14, 1933 |
| 2,688,857 | Jones | Sept. 14, 1954 |